United States Patent
Batlle

(10) Patent No.: US 9,163,526 B2
(45) Date of Patent: Oct. 20, 2015

(54) VERTICAL SHAFT TURBOMACHINE

(75) Inventor: Frederic Batlle, Lons (FR)

(73) Assignee: TURBOMECA, Bordes (FR)

( * ) Notice: Subject to any disclaimer, the term of this patent is extended or adjusted under 35 U.S.C. 154(b) by 682 days.

(21) Appl. No.: 13/579,140

(22) PCT Filed: Feb. 23, 2011

(86) PCT No.: PCT/FR2011/050372
§ 371 (c)(1),
(2), (4) Date: Aug. 15, 2012

(87) PCT Pub. No.: WO2011/104477
PCT Pub. Date: Sep. 1, 2011

(65) Prior Publication Data
US 2012/0321460 A1 Dec. 20, 2012

(30) Foreign Application Priority Data
Feb. 25, 2010 (FR) ..................... 10 51347

(51) Int. Cl.
*F01D 25/16* (2006.01)
*F02C 7/06* (2006.01)
(52) U.S. Cl.
CPC . *F01D 25/16* (2013.01); *F02C 7/06* (2013.01); *F05D 2220/329* (2013.01); *F05D 2250/315* (2013.01); *Y02T 50/671* (2013.01)
(58) Field of Classification Search
CPC ......... F01D 25/16; F01D 25/168; F02C 7/06; F05D 2250/315; F05D 2220/329
See application file for complete search history.

(56) References Cited

U.S. PATENT DOCUMENTS

| | | | |
|---|---|---|---|
| 3,187,188 A | 6/1965 | Adkins et al. | |
| 3,493,311 A | 2/1970 | Robey | |
| 3,601,495 A | 8/1971 | Bean | |

FOREIGN PATENT DOCUMENTS

| | | | |
|---|---|---|---|
| EP | 0 494 167 | 4/1995 | |
| FR | 1 400 147 | 5/1965 | |
| FR | 2 018 549 | 5/1970 | |
| FR | 1 603 209 | 4/1971 | |
| GB | 787 738 | 12/1957 | |
| GB | 989477 | * 4/1964 | |
| GB | 989 477 | 4/1965 | |
| WO | WO 9105151 A1 | * 4/1991 | F01D 15/10 |

OTHER PUBLICATIONS

Maghon, Helmut, Vertical Gas Turbine, Apr. 18, 1991, WIPO 91905151 A1, translation of specification.*
International Search Report Issued Jul. 4, 2011 in PCT/FR11/50372 Filed Feb. 23, 2011.

* cited by examiner

*Primary Examiner* — Dwayne J White
*Assistant Examiner* — Jason Fountain
(74) *Attorney, Agent, or Firm* — Oblon, McClelland, Maier & Neustadt, L.L.P.

(57) ABSTRACT

A turbomachine includes a compressor, a first shaft, a second shaft, a first turbine, and a second turbine. The first shaft carries at least one turbine wheel belonging to one of the elements selected from the first and second turbines. The second shaft carries at least one turbine wheel belonging to the other element selected from the first and second turbines. The first and second shafts are oriented substantially vertically in normal utilization situations of the turbomachine. The first shaft is held by a first single bearing while the second shaft is held by a second single bearing.

9 Claims, 1 Drawing Sheet

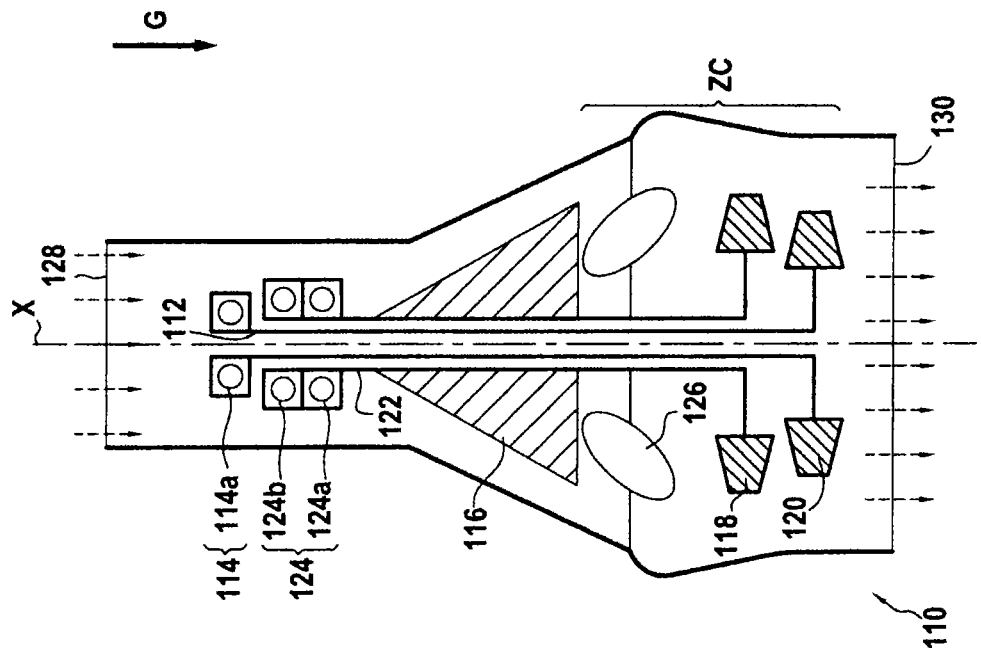
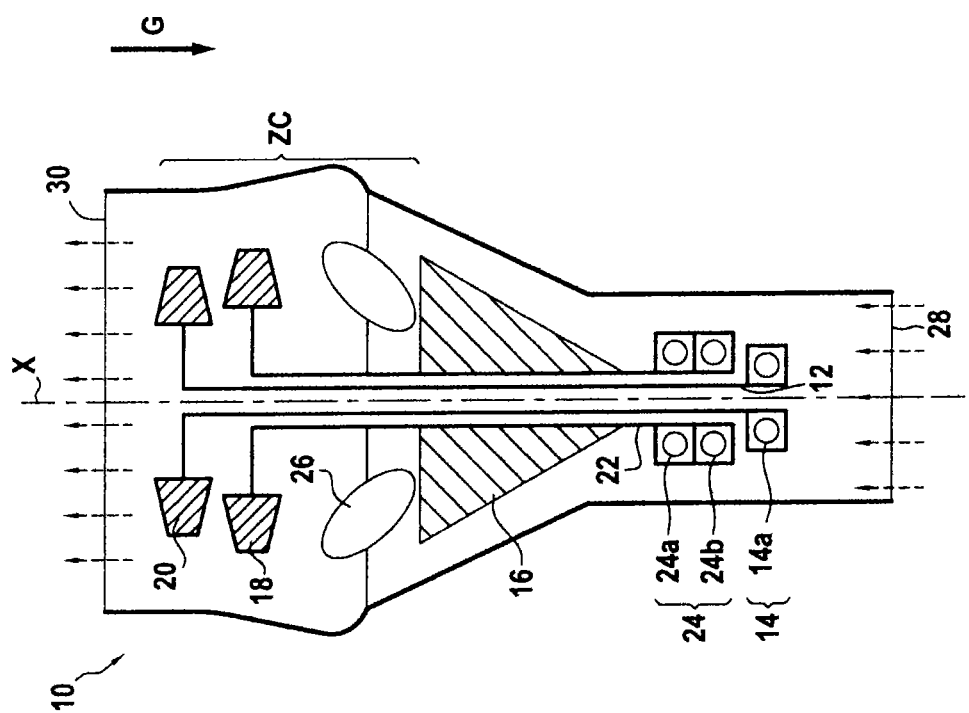

VERTICAL SHAFT TURBOMACHINE

FIELD

The invention relates to the field of turbomachines.

BACKGROUND

Conventionally, a turbomachine comprises at least one shaft connected to at least one turbine wheel (which turbine wheel may be free or linked) the shaft being arranged horizontally, i.e. with its axis oriented in a direction that is substantially perpendicular to the direction of gravity. In order to hold the shaft appropriately and support its weight, a plurality of bearings are distributed along the shaft, generally two bearings. Thus, in a turbomachine comprising in succession from upstream to downstream: a compressor, a combustion chamber, and a turbine, one bearing is located upstream from the compressor, and another bearing is located downstream from the combustion chamber. That presents several drawbacks.

A first drawback is that the shafts are often long and heavy, and in spite of the point support provided by each bearing, there remain long portions that are cantilevered out and in which the shaft can deform as a result of its own weight and of the weight of the turbine wheel(s) it carries. Such static deformation modifies the straightness of the shaft, and creates an unbalance while the turbomachine is in operation and the shaft is revolving about its own axis.

A second drawback is associated with the presence of a plurality of bearings, thereby increasing the weight of the turbomachine and decreasing its efficiency.

Finally, a third drawback is that the bearing that is located downstream from the combustion chamber is in a zone of the turbomachine that is particularly hot, where it is subjected to high levels of thermal stress. In order to ensure that that bearing operates properly, and in order to avoid any risk of it coking, it is necessary to provide a cooling system, conventionally using a cooling oil circuit. Such a cooling system is complex to install and to maintain, and it increases the costs of manufacturing and maintaining the turbomachine, as well as further increasing its weight.

BRIEF SUMMARY

An object of the invention is to mitigate substantially at least one of the above-mentioned drawbacks.

This object is achieved by a turbomachine having at least one shaft carrying at least one turbine wheel, wherein the shaft is oriented substantially vertically in situations of normal utilization of the turbomachine, the shaft being held by a single bearing.

It should be observed that said turbine wheel may belong equally well to a linked turbine or a free turbine of the turbomachine. A linked turbine is a turbine that is mechanically linked to a compressor of the turbomachine, while a free turbine is a turbine that is mechanically independent of the compressor.

In the present specification, the vertical direction corresponds to the direction of gravity. Thus, oriented "vertically" means oriented "in the direction of gravity". The adverb "substantially" is used to mean that the direction in which the shaft is oriented may depart a little from the vertical direction.

The term "situations of normal utilization of the turbomachine" is used to mean situations in which the turbomachine is mounted on board a vehicle, in particular an aircraft (in which case the turbomachine is constituted for example by a turbojet or a turboshaft engine), with the vehicle traveling horizontally (on land, on the water, or in the air) or indeed the turbomachine is mounted on an industrial production site (in which case the turbomachine may be constituted for example by a terrestrial gas turbine). The turbomachine may be operating or stopped. Thus, in particular, situations involving transport prior to installation, or repair of a turbomachine do not constitute "situations of normal utilization".

It can be understood that by positioning the shaft in the vertical direction, the shaft is no longer cantilevered out in a way that can lead to static deformation that can modify its straightness, as a result of its own weight and as a result of the weight of the turbine wheel. Unlike prior art turbomachines, the shaft of the invention is thus not subjected to radial static forces (i.e. forces acting in a direction perpendicular to the axis of the shaft and intersecting said axis). Naturally, since the shaft is likewise subjected to little or no axial force (i.e. forces acting along the axis of the shaft), there is no risk of the shaft buckling and having its straightness modified. The weight of the shaft and the turbine wheel represents a force that is negligible for the shaft in its axial direction. This ensures that the shaft remains straight.

Furthermore, since the shaft is arranged vertically, there is no need, as in the prior art, to hold the shaft by means of a plurality of bearings distributed along its length in order to support its weight. The shaft can be held correctly by being held at a single location by a single bearing. Naturally, the single bearing must be suitable for supporting the weight of the assembly constituted by the shaft and the turbine wheel(s) in the axial direction.

Furthermore, in situations of normal utilization, while the turbomachine is in operation, the shaft is stabilized about its original axial position (i.e. its axial position when stopped) by the gyroscopic effect. The gyroscopic effect is the tendency of any body that is in rapid rotation about an axis to oppose any force seeking to change the direction of its axis of rotation. Thus, the axial position of the shaft remains the same within the turbomachine whatever the situations of normal utilization of the turbomachine, firstly because of the bearing (which holds the shaft in its original position within the turbomachine and supports its weight when the turbomachine is stopped), and secondly as a result of the gyroscopic effect (which stabilizes the shaft about its original position within the turbomachine while the turbomachine is in operation).

Furthermore, since the turbomachine has a single bearing, there is a saving in weight compared with prior art turbomachines that have a plurality of bearings. Thus, the turbomachine of the invention is lighter in weight and consequently presents improved efficiency compared with prior art turbomachines.

The single bearing also makes it possible to achieve a saving of space within the turbomachine. The single bearing of the turbomachine of the invention occupies less space than the plurality of bearings in prior art turbomachines. This saving in space makes it possible in particular for the turbomachine of the invention to be more compact than prior art turbomachines, for example by shortening the shaft.

It should be observed that the term "single bearing" is used to designate an assembly comprising a single ring supporting the shaft or an assembly comprising a plurality of rings supporting the shaft and located side by side, insofar as those support rings located side by side are distributed over less than 10% of the length of the shaft.

Advantageously, the turbomachine has a hot zone and the single bearing is located outside the hot zone.

Conventionally, in a turbomachine, the hot zone is the zone in the vicinity of and immediately downstream from the combustion chamber and in which the (free and/or linked) turbines are situated that are driven by the hot gas.

It can thus be understood that the bearing may be located in any zone along the shaft outside the hot zone. In particular, the bearing may be located upstream from the combustion chamber, or beyond the zone that is immediately downstream from the combustion chamber.

In an embodiment, in particular when the turbomachine is a turbojet or a helicopter turbine engine, the bearing is located in a cold zone of the turbomachine, i.e. in a zone where the temperature does not exceed 200° C. (two hundred degrees Celsius).

In another embodiment, the bearing is located in the hot zone of the turbomachine. Under such circumstances, in order to protect the single bearing from high temperatures, it is confined in a zone that is cooled and/or in a zone that is protected by a heat screen.

It should be observed that in the present specification, the terms "upstream" or "downstream" refer to the normal flow direction of gas through the turbomachine.

Preferably, the turbomachine has a combustion chamber and the single bearing is located upstream from said combustion chamber.

The temperature of the gas upstream from the combustion chamber is lower than the temperature of the gas downstream from the combustion chamber. Thus, by locating the bearing upstream from the combustion chamber, it is ensured that the bearing is located in an environment in which it is subjected to thermal stresses that are less than those to which it would be subjected if it were located downstream from the combustion chamber. These thermal stresses upstream from the combustion chamber are small enough to avoid damaging the bearing, and no cooling device is required for the bearing.

Preferably, the turbomachine has a compressor, and the single bearing is located upstream from the compressor.

Advantageously, the turbomachine has a compressor, a first turbine, and a second turbine, with said shaft constituting a first shaft carrying at least one turbine wheel belonging to one of the elements selected from the first turbine and the second turbine, and said single bearing constitutes a first single bearing.

For example, in a variant, the first turbine is a linked turbine while the second turbine is a free turbine. In another variant, the first turbine is a turbine linked to a high-pressure spool while the second turbine is a turbine linked to a low-pressure spool.

Advantageously, the turbomachine also includes a second shaft that is oriented substantially vertically in situations of normal utilization of the turbomachine, said second shaft carrying at least one turbine wheel belonging to the other element selected from the first turbine and the second turbine, said second shaft being held by a second single bearing.

Advantageously, the first and second shafts are coaxial. In addition, the first shaft preferably passes inside the second shaft. Also preferably, the first and second single bearings are located upstream from the compressor.

In an embodiment, the turbomachine of the invention is (i.e. constitutes) an aircraft turbojet or turboshaft engine. Preferably, the turbomachine of the invention is (i.e. constitutes) a helicopter turboshaft engine.

BRIEF DESCRIPTION OF THE DRAWINGS

The invention and its advantages can be better understood on reading the following detailed description of embodiments of the invention given as non-limiting examples. The description refers to the accompanying drawings, in which:

FIG. 1 is a diagrammatic longitudinal section showing a first example of a turbomachine; and FIG. 2 is a diagrammatic longitudinal section showing a second example of a turbomachine.

DETAILED DESCRIPTION

FIG. 1 shows a first example of a turbomachine 10 shown diagrammatically in longitudinal section on the axis X of the turbomachine 10. The axis X of the turbomachine 10 is oriented vertically, i.e. parallel to the direction of gravity G as represented by a bold arrow. The dashed-line arrows indicate the flow direction of gas through the turbomachine.

The turbomachine 10 includes a shaft 12 that is oriented vertically and held by a single bearing 14, the turbomachine being shown in a normal utilization situation. The turbomachine 10 comprises a compressor 16, a linked turbine 18 and a free turbine 20, the shaft 12 constituting a first shaft carrying a turbine wheel forming part of the free turbine 20, and the single bearing 14 constituting a first single bearing.

In the example shown, the free turbine 20 and the linked turbine 18 have only a single turbine wheel each. Naturally, in a variant, the linked turbine and/or the free turbine could present a plurality of turbine wheels.

The turbomachine 10 also has a second shaft 22, likewise oriented vertically, the second shaft 22 carrying the turbine wheel belonging to the linked turbine 18, the second shaft 22 being held by a second single bearing 24.

The first shaft 12 is coaxial with the second shaft 22 and passes inside it.

The first and second single bearings 14 and 24 are located upstream from the compressor 16.

The first shaft 12 carrying the free turbine 20 is mechanically connected to a force transmission device (not shown) for the purpose of making use of the driving energy generated by the turbomachine 10.

The turbomachine 10 also has a combustion chamber 26 of annular shape around the axis X, the first and second bearings 14 and 24 being located upstream from the combustion chamber 26. It should be observed that in this example the compressor 16 and the linked turbine 18 are both carried by the second shaft 22, while the free turbine 20 is carried by the first shaft 12. The combustion chamber 26 is stationary and carried by the casing of the turbomachine 10. Furthermore, the free turbine 20 is located downstream from the linked turbine 18.

Gas at ambient temperature penetrates into the turbomachine 10 via a gas admission inlet 28. The gas is then compressed by the compressor 16. Thereafter, the gas enters the combustion chamber 26 where a fuel is injected and burnt. This heats the gas. The hot gas is then allowed to expand and cool on passing through the turbines 18 and 20. The linked turbine 18 drives the compressor 16, while the free turbine 20 drives the first shaft 12 that transmits the mechanical energy as recovered in this way to the force transmission device (not shown). Finally, the gas is exhausted from the turbomachine 10 via an exhaust outlet 30. It can be understood that the temperature of the gas decreases going from the combustion chamber 26 to the free turbine 20, and more generally all the way to the gas exhaust outlet 30.

Thus, the zone ZC lying between the upstream end of the combustion chamber 26 and the downstream end of the free turbine 20 constitutes a hot zone of the turbomachine 10. It should be observed that the linked and free turbines 18 and 20 are arranged in the zone immediately downstream from the combustion chamber 26.

By placing the first and second single bearings 14 and 24 upstream from the compressor 16, in the vicinity of the gas admission inlet 28, the first and second single bearings 14 and 24 are located outside the hot zone ZC. In a variant, the first and/or second bearing is located outside the hot zone ZC downstream from the free turbine 20. Nevertheless, although it can be withstood by the single bearing 14 and 24, the ambient temperature at that location is higher than upstream from the hot zone ZC. In other words, it is upstream from the combustion chamber 26, and more particularly in the vicinity of the gas admission inlet 28, that the bearings 14 and 24 are the least subjected to thermal stress.

In this example, the single bearing 14 has a single shaft support ring 14a while the single bearing 24 has two shaft support rings 24a and 24b. By way of example, these support rings 14a, 24a, and 24b are ball bearings, roller bearings, etc.

Furthermore, the bearings 14 and 24 are located in the bottom portion of the turbomachine 10 in the vertical direction (which coincides with the axial direction X of the turbomachine 10). More generally, in FIGS. 1 and 2, the bottom portion corresponds to the bottoms of the figures, while the top portion corresponds to the tops of the figures. In other words, the bottom portion is the portion to which gravity G is directed, and the top portion is the opposite portion.

In FIG. 1, the bearings 14 and 24 hold the shafts 12 and 22 via their bottom ends. Thus, the bearings 14 and 24 support the shafts 12 and 22 from underneath. In other words, the architecture of the turbomachine 10 can be thought of as an architecture "standing" on the bearings 14 and 24. In this example, gas is admitted into the turbomachine 10 from below via the bottom portion of the turbomachine 10 and is expelled from above from the top portion of the turbomachine 10.

FIG. 2 shows a second example of a turbomachine 110 similar to the first example of a turbomachine 10. Components that are similar are not described again and they are given numerical references that are increased by 100.

The main difference between the turbomachine 10 and the turbomachine 110 is that they are opposite-ways up, the elements in the bottom portion of the turbomachine 10 being in the top portion of the turbomachine 110, and vice versa. Thus, the first and second single bearings 114 and 124 are in the top portion of the turbomachine 110 and they hold the first and second shafts 112 and 122 from above, via their top ends. In other words, the architecture of the turbomachine 110 can be considered as an architecture that is "suspended" from the bearings 114 and 124. In this example, gas is admitted into the turbomachine 110 from above into the top portion of the turbomachine 110 and is expelled from below from the bottom portion of the turbomachine 110.

The invention claimed is:

1. A turbomachine, comprising:
   a compressor;
   a first shaft;
   a second shaft;
   a first turbine; and
   a second turbine,
   the first shaft carrying at least one turbine wheel belonging to one of the first turbine,
   the second shaft carrying at least one turbine wheel belonging to the second turbine,
   the first and second shafts being oriented substantially vertically in normal utilization situations of the turbomachine, and
   the first shaft being held by a first single bearing while the second shaft is held by a second single bearing.

2. The turbomachine according to claim 1, wherein the first shaft and the second shaft are coaxial.

3. The turbomachine according to claim 2, wherein the first shaft passes inside the second shaft.

4. The turbomachine according to claim 3, further comprising a hot zone,
   wherein the first and second single bearings are located outside said hot zone.

5. The turbomachine according to claim 3, further comprising a combustion chamber,
   wherein the first and second single bearings are located upstream from said combustion chamber.

6. The turbomachine according to claim 4, further comprising a combustion chamber,
   wherein the first and second single bearings are located upstream from said combustion chamber.

7. The turbomachine according to claim 3, wherein the first and second single bearings are located upstream from the compressor.

8. An aircraft turbojet, comprising:
   the turbomachine according to claim 1.

9. A turboshaft engine, comprising:
   the turbomachine according to claim 1.

* * * * *